Aug. 22, 1950   P. GLASS ET AL   2,519,562
ELECTRICAL CONTROL CIRCUIT
Filed Feb. 12, 1944   2 Sheets-Sheet 1
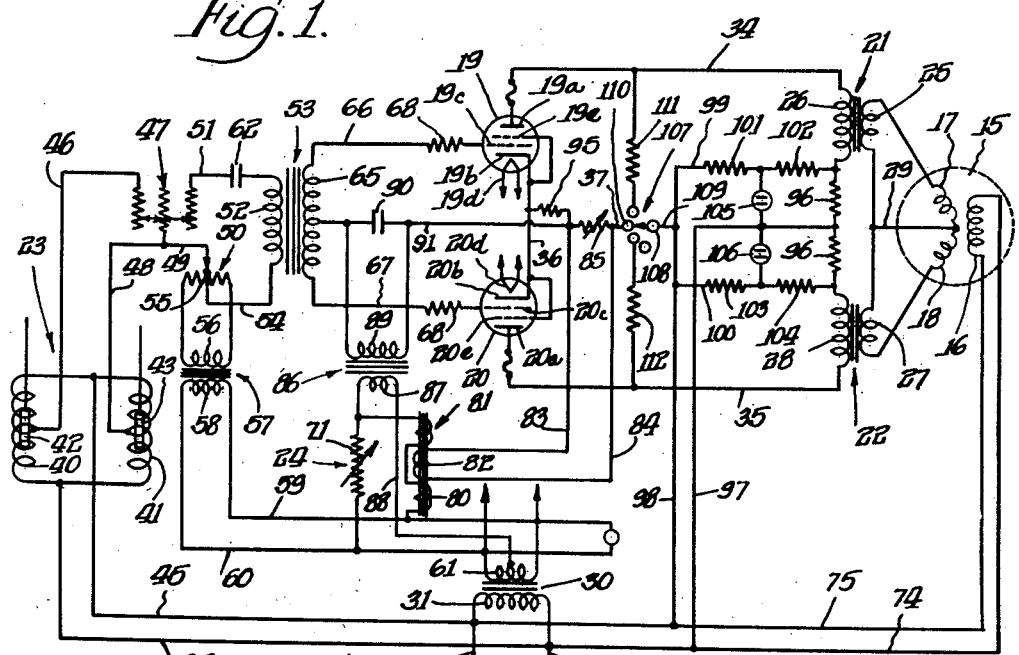
Fig. 1.
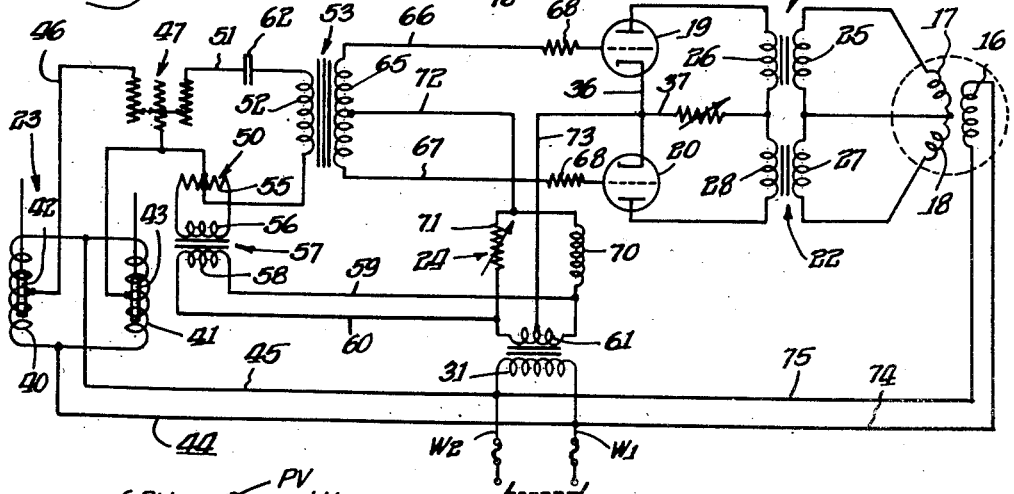
Fig. 2.
Fig. 3.
INVENTOR.
Paul Glass
Frank E. Prem Aug. 22, 1950      P. GLASS ET AL      2,519,562
ELECTRICAL CONTROL CIRCUIT
Filed Feb. 12, 1944

INVENTOR.
Paul Glass
Frank E. Prem

Patented Aug. 22, 1950

2,519,562

UNITED STATES PATENT OFFICE 2,519,562

ELECTRICAL CONTROL CIRCUIT

Paul Glass and Frank E. Prem, Chicago, Ill., assignors to Askania Regulator Company, Chicago, Ill., a corporation of Illinois Application February 12, 1944, Serial No. 522,048

27 Claims. (Cl. 318—208)

The invention relates generally to an electrical control circuit and more particularly to an electrical circuit for controlling alternating current operated devices, including especially motors, by unidirectional current electric-valve tubes.

One object of the invention is to provide a new and improved control circuit of the character described for governing the energization and deenergization and the direction of movement, if any, of an alternating current operated device.

Another object is to provide a new and improved control circuit of the character described which is responsive to an alternating current signal voltage.

Another object is to provide a control circuit responsive to an alternating current signal voltage for governing the energization of a device to be controlled and further to govern the frequency of the energizing pulses to constitute speed control where the device has a movable part as in a motor.

Still another object is to provide a control circuit responsive to an alternating current signal voltage for governing the starting and stopping, the direction of movement, and also the speed of movement of an electric-motor-driven element in which the speed at which the element is driven is dependent upon and controlled by the magnitude of the signal voltage.

Still another object is to provide a control circuit responsive to an alternating current signal voltage for governing the starting and stopping, the direction of movement, and also the speed of movement of an electric-motor-driven element in which the speed at which the element is driven is proportional to the magnitude of the signal voltage.

A further object is to provide a control circuit for an alternating current electric motor in which the motor speed is proportional to the magnitude of the signal voltage applied to the circuit and in which the speed is controlled by variation in the number of cycles during which the motor is energized while obtaining full torque during the energizing cycles.

Other objects and advantages will become apparent from the following detailed description taken in connection with the accompanying drawings, in which:

Fig. 1 is a view of a circuit embodying the features of this invention.

Fig. 2 is a view illustrating the basic portion of the circuit of Fig. 1.

Fig. 3 is a view illustrating graphically the phase relationships of the various voltages but not intended as accurate representations of the magnitudes of the voltages.

Figure 4:
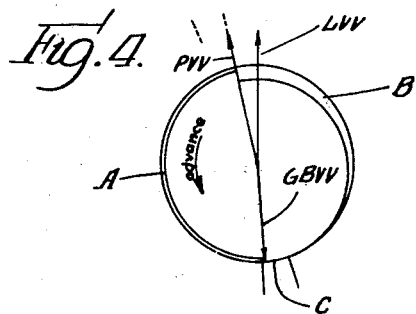
Fig. 4 is a vector type diagram illustrating the phase relationships of the various voltages, the condition represented being the stand-by condition.

While the invention is susceptible of various modifications and alternative constructions, it is shown in the drawings, and will hereinafter be described in a preferred embodiment. It is not intended that the invention is to be limited thereby to the specific construction disclosed. On the contrary, it is intended to cover all modifications and alternative constructions, all applications and adaptations of the invention falling within the spirit and scope of the invention as defined in the appended claims.

In the exemplary embodiment of the invention shown in Fig. 1 of the drawings for purposes of disclosure, and also in the basic circuit shown in Fig. 2 to facilitate understanding of the invention, 15 represents a reversible, shaded pole motor having main or exciting windings, represented by the coil 16, and shading coil windings, represented by the coils 17 and 18, and operating in well known manner to run in one direction or the other depending upon which of the shading coils 17 or 18 is energized. While a reversible, shaded pole motor is represented in this exemplary embodiment, it is to be understood that the invention is in no way limited to control of such a motor, but that a pair of motors adapted to run in opposite directions might well be substituted. In fact, the coils 17 and 18 are not intended to be limited to motor windings, but broadly represent electrical devices to be controlled by the circuit herein. They may take the form, as here, of motor windings, or may be relays, tubes or a variety of other electrical devices whose energization or deenergization is to be governed and which, as herein, by way of example, results in the driving of an element in a forward or reverse direction and at different speeds.

Associated with these devices (coils 17 and 18) is a control circuit comprising, generally, a pair of thyratron tubes 19 and 20 acting to govern the coils 17 and 18 through a pair of reactors 21 and 22, and governed by signal generating means 23. Bias phase shifter means 24 is provided for creating a grid bias on the tubes 19 and 20, normally preventing them from firing when no signal is received. Generally speaking, application of a signal of one character initiates operation or firing of the tube 19 which, in turn, so varies the impedance of the reactor 21 as to bring about energization of the coil 17. Receipt of a signal of opposite character initiates operation or firing of the tube 20 which, in turn, so varies the impedance of the reactor 22 as to bring about energization of the coil 18. Not only does the receipt of a signal initiate firing of one tube or the other, but it is a feature of this invention that the speed at which the motor 15 rotates is dependent upon and proportional to the magnitude of the signal voltage.

Turning now to a more detailed consideration of the circuit, the reactor 21 comprises a first, primary or reactor winding 25 and a second, secondary or control winding 26 having a common magnetic core. Similarly, reactor 22 comprises a first, primary or reactor winding 27 and a second, secondary or control winding 28 having a common magnetic core. The reactor windings 25 and 27 each have a normal, relatively high impedance which is materially lowered upon flow of unidirectional current through the corresponding secondary or control windings 26 and 28, respectively. It is this characteristic of the reactors that is here employed to control the effectiveness of the coils 17 and 18. To that end, the reactor winding 25 is connected in series with the coil 17, while the reactor winding 27 is connected in series with the coil 18, the two circuits having a common lead 29 connected between the coils 17 and 18 and between the reactor windings 25 and 27. Excitation for the coils 17 and 18 is in this instance derived from the main winding 16 which, though energized whenever the control circuit is in operation, is, nevertheless, ineffective to render the coils 17 and 18 effective unless the impedance of the circuit is reduced through the flow of unidirectional current through the secondary or control winding of the associated reactors. The ineffectiveness of the coils 17 and 18 to cause rotation of the motor is due to two factors. The first is that the impedance of the coils 25 and 27, when no unidirectional current is flowing in the corresponding coils 26 and 28, is so high as to limit the current in the coils 17 and 18 to such low value as to be ineffective, and the second reason is that the currents are equal and opposed so that the effects of the coils 17 and 18 are nullified.

The tubes 19 and 20 are of the thyratron grid control type. Accordingly, the tube 19 comprises an anode or plate 19a, a cathode 19b and a control grid 19c. Similarly, tube 20 comprises an anode or plate 20a, a cathode 20b and a control grid 20c. The cathodes are herein shown indirectly heated through filaments 19d and 20d, respectively, energized from a common alternating current source through a heater transformer 30 whose primary winding 31 is connected to line wires W1 and W2. This transformer also serves additional purposes, as will presently be made known. Each tube is here shown as also having a screen grid 19e and 20e, respectively.

The plate voltage for the tube 19 is supplied by the winding 26, the reactor 21 serving the dual purpose of a reactor and a transformer, and to that end the plate 19a is by a lead 34 connected to one terminal of the winding 26. The plate voltage for the tube 20 is in a like manner provided by the winding 28 of the reactor 22, and to that end the plate 20a is by a lead 35 connected to one terminal of the winding 28. Basically the remaining ends of the windings 26 and 28 are connected to the cathodes 19b and 20b which are, in turn, connected by a lead 36. In the basic circuit of Fig. 2, the windings 26 and 28 are shown connected by a common lead 37 to the lead 36 interconnecting the cathodes of the tubes, while, in the complete circuit of Fig. 1, the basic structure is amplified by the incorporation of operation indicating means, operation selector means, and operation controlling means, all as will later be more fully described.

The signal for controlling the firing of the tubes 19 and 20 is provided by the signal generating means 23. This means must be capable of generating two signals of opposed character in order that the tube 19 or tube 20 may be selectively caused to fire, this opposed character of the signals taking the form of a substantial 180° phase displacement. The signal generating means must also be capable of generating signals of varying voltage. Herein the means 23 takes the form of an inductance bridge composed of coils 40 and 41 each having a relatively movable core 42 and 43, respectively. The cores 42 and 43 are variously actuated to produce the desired signal depending upon the purpose to which the circuit is put. When used for control purposes, for which this circuit is particularly adapted, one of the cores may be actuated by a demand or condition to be met or controlled, while the other may be actuated by the motor 15 progressively to offset the effect of the one core as the new adjustment is approached. The coils 40 and 41 are energized directly from the line wires W1 and W2 and to that end are, in well known manner, connected to the line wires by leads 44 and 45 connected to the terminals of the windings 40 and 41. A center tap of the winding 40 is by a lead 46 connected to one terminal of a T-pad attenuator 47, while a center tap of the winding 41 is by a lead 48 connected to a second terminal of the attenuator 47. This last named terminal of the attenuator 47 is by a lead 49 also connected to the adjustable contact of a potentiometer 50 connected in circuit to provide an equalizing voltage. The third and remaining terminal of the attenuator 47 is by a lead 51 connected to one end of the primary winding 52 of a signal input transformer 53. The remaining end of the winding 52 is by a lead 54 connected to the midpoint of the winding 55 of the potentiometer 50. The winding 55 is connected to the secondary winding 56 of an equalizer transformer 57, the primary 58 of which is by leads 59 and 68 connected to the secondary winding 61 of the transformer 30.

To give the signal voltage the proper phase relationship with respect to the line voltage, so that it may be effective to control the tubes 19 and 20, as well as to accomplish certain other purposes which will hereinafter be made more fully apparent, a condenser 62 is interposed in the lead 51 so as to be connected in series with the attenuator 47 and the winding 52. Moreover, the values of the condenser and the winding 52 are chosen to give resonance at the frequency of the signal source and at a signal of minimum value. If the circuit elements are properly chosen, the voltage measured across the secondary of the input transformer and resulting from a minimum signal will be substantially 90° out of phase with the line voltage. Transformer 53 has an iron core.

Forming the secondary of the input transformer 53 is a winding 65, one end of which is by a lead 66 connected to the control grid 19c and the other end of which is by a lead 67 connected to the control grid 20c. A resistor 68 is connected in each of the leads 66 and 67. In order that the tubes may not fire when no signal is supplied to the input transformer 53, an alternating current grid bias must be provided which is substantially 180° out of phase with the plate voltage. Such grid bias is here provided by the grid bias phase shifter means 24. In the basic circuit shown in Fig. 2, the bias phase shifter means 24 is composed of an inductance 70, a variable resistance 71, and the secondary winding of a transformer which may be, and is in the completed circuit, the winding 61 of the transformer 30 connected in series. The midpoint of the secondary winding 65 of the input transformer 53 is by a lead 72 connected to this series circuit intermediate the inductance and the resistance, while a lead 73 interconnects the midpoint of the winding 61 with the lead 36 interconnecting the cathodes of the tubes. With the phase shifter just described, the grid bias voltage can be adjusted to have a phase angle lagging the line voltage from zero up to 180° by varying the resistance 71 between its maximum value and zero. Throughout such variation in phase angle, the magnitude of the voltage remains the same, being equal to one-half the voltage across the winding 61. The basic circuit is completed by connection of the main winding 16 of the motor 15 to the line wires W1 and W2 through leads 74 and 75. Preferably a master switch 76 is provided for connecting the line wires W1 and W2 to the source of power, normally a 110-volt, 60-cycle source.

Referring now to Fig. 3 and to Fig. 2, wherein, as an aid to the understanding of this invention, there is depicted the basic circuit so far described segregated from the remainder of the complete circuit, the curve LV represents the line voltage, the curve PV represents the non-firing plate voltage of a tube, while the curve GBV represents the grid bias voltage which has been adjusted to be 180 degrees out of phase with the plate voltage. The plate voltage is, in the basic circuit, equivalent to the voltage of the secondary windings of the reactors which in turn is determined by the voltage induced in the shading coils 17 and 18, and by the stepping up of the reactors acting as transformers. In Fig. 3, the plate voltage is shown advanced in phase with respect to the line voltage only because of the peculiar characteristic of the shaded pole motor 15 in which the voltage induced in the shading coils is slightly advanced with respect to the line voltage. With other devices that might be controlled by this circuit, such phase displacement between the plate and line voltages may not be present, and its presence here does not in any way affect the operation of the invention.

It is a known characteristic of thyratron tubes that, once broken down, they will continue to fire during the remaining portion of the half cycle that the plate is positive. Each tube, moreover, depending upon the characteristics of the particular tube, has a critical grid voltage which, when reached or exceeded while the plate is positive, results in break-down of the tube. This critical voltage is usually relatively low. Hence a grid voltage leading the plate voltage by almost 180°, such as that represented, by way of example, by the curve GV of Fig. 3, results in break-down of the tube throughout substantially the full half cycle that the plate is positive. It is known, and, moreover, can readily be seen from Fig. 3, that this will occur even though the grid voltage is gradually retarded with respect to the plate voltage until it is in phase therewith. Even though the grid voltage may be displaced so much in phase as to lag the plate voltage, it will still result in break-down of the tube, though for a period less than the substantially entire half cycle that the plate is positive. As the grid voltage lags the plate voltage by successively greater angles, the period of firing of the tube becomes progressively shorter, until a point is reached where no break-down of the tube, not even for a short interval, occurs. This point is something less than a 180° lag of the grid voltage relative to the plate voltage and usually is short of a full 180° by the same amount that the leading grid voltage capable of causing break-down of the tube is short of 180°. Thus if in a circuit, such as the basic circuit described, a small signal is applied which, as above stated, is 90° out of phase with the line voltage, which signal voltage is represented in Fig. 3 by the curve SV, the grid voltage GV results, which, as above pointed out, results in break-down of the tube for substantially the entire half cycle that the plate is positive.

For convenience and more ready understanding, the vector type diagram of Figs. 4 to 11 will be employed in the subsequent disclosure of the invention in preference to the representation of Fig. 3. In such figures, LVV represents the line voltage vector, PVV represents the firing plate voltage vector, GBVV represents the grid bias voltage vector, and GVV represents the grid voltage vector. The sector A is that range of phase relationship above described into which the grid voltage vector must fall if the tube is to break down for substantially the entire half cycle that the plate is positive. This range extends from a leading phase angle of something less than 180° to in phase relationship. The sector B represents that range of lagging phase relationship which results in break-down of the tube for progressively smaller periods as the phase angle increases. This decrease in length of break-down is intended to be represented by the wedge-shape of the sector B. The sector C is the dead zone of the tube, location of the grid voltage vector within which results in no firing whatsoever of the tube. In these vector diagrams, clockwise rotation is considered as retardation, while counterclockwise rotation is considered as advance of a vector with respect to the line voltage.

Figure 5:
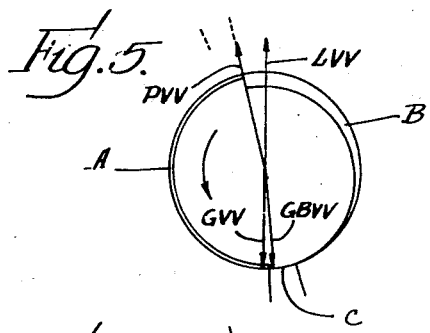
Fig. 5 is a view of the type of Fig. 4 showing the condition when a signal has been applied to the circuit but before firing of the tube has commenced.

Fig. 4 illustrates the positions of the various voltage vectors when no signal is being received and with the grid bias voltage vector adjusted through the medium of the bias phase shifter 24 to lie in the dead zone C just outside of the sector A. If now a small signal, such as that represented by the curve SV in Fig. 3, is applied, it will retard the grid voltage vector GVV into the sector A, as shown in Fig. 5, resulting in break-down of this tube during substantially the entire positive half cycle of the plate voltage. The other tube, however, will be prevented from firing since its grid voltage vector will be advanced into the dead zone. Were the conditions to remain as described, particularly the phase relationship of the plate voltage, removal of the signal would return the grid voltage vector to the position of the grid bias voltage vector, that is, back into the dead zone C, and firing of the tube would stop at the end of the half cycle that the plate voltage is positive and would not recommence with the succeeding positive half cycles of plate voltage. The circuit would then be an on-and-off circuit.

Figure 6:
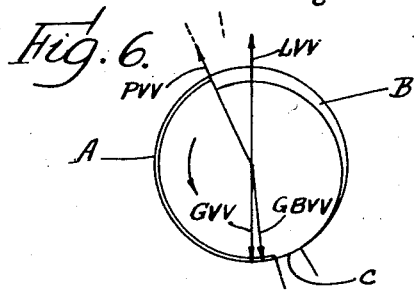
Fig. 6 is a view of the type of Fig. 4 showing the condition after firing of the tube.
Figure 7:
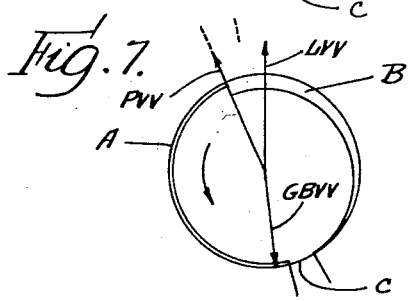
Fig. 7 is a view of the type of Fig. 4 with the signal removed.

It has been found, however, as more particularly set forth in our copending joint application Serial No. 650,042, filed February 25, 1946, and constituting a continuation in part of our application Serial No. 507,006 filed October 20, 1943, now forfeited, that, due to the peculiarities of the combination of motor, reactor and tube, the plate voltage of the tube when firing appears to be advanced in phase with respect to its non-firing voltage. As more fully pointed out in the above identified application, and utilizing the non-firing plate voltage of the tube as a reference voltage, the plate voltage of the tube when firing becomes negative for only a portion of what would be the negative half cycle of the reference voltage and rises to a small positive peak substantially in advance of the time that the reference voltage again becomes positive. It is during this positive peak that the tube, if otherwise conditioned for firing, again breaks down. Hence it is this positive peak and its positional or phase relationship which controls the firing or non-firing of the tube and thus is the important and material portion of the firing plate voltage. While there may be some question as to the propriety of referring to the firing plate voltage by terms usually reserved for the substantially sinusoidal voltages, the positive peak, above described, is believed most conveniently and picturesquely yet accurately described as advanced in phase with respect to the non-firing or reference plate voltage. Hereinafter, therefore, where the term plate voltage is employed to designate the firing plate voltage, this peak is primarily intended. It is also pointed out at this time that in the vector diagrams of Figs. 4 to 11, inclusive, the plate voltage vector PVV represents this positive peak, this mode of representation being extremely helpful in the explanation of the invention. The condition of the circuit upon the application of a signal is shown in Fig. 5, and it has already been described above. With the commencement of firing of the tube, the plate voltage is advanced, resulting in a counter-clockwise rotation of the sectors A, B and C, so that the grid bias voltage vector as well as the grid voltage vector is now well within the sector A, as clearly seen in Fig. 6, and removal of the signal would leave the grid bias voltage vector within the sector A, as shown in Fig. 7. This means that removal of the signal would not arrest firing of the tube. While this holding characteristic might be desirable for certain applications, it is not desirable for motor control application. Accordingly, means is provided herein which not only may be utilized to overcome this holding characteristic and restore the circuit to an on-and-off circuit, but is particularly adapted to attain the feature of this invention, namely, a control in which the speed of the motor is governed by the magnitude of the signal voltage.

Figure 8:
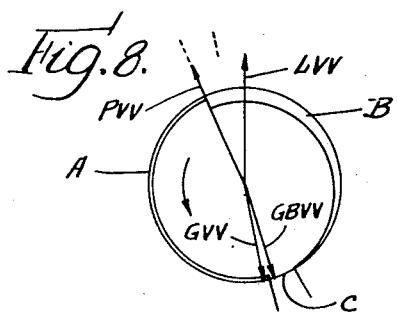
Fig. 8 is a view of the type of Fig. 4 showing the grid bias voltage advanced through the same phase angle that the plate voltage is advanced upon firing of the tube.

To that end, provision is made whereby the grid bias is, upon commencement of firing of the tube, advanced through the same angle that the plate voltage is advanced, so that the grid voltage vector and the grid bias voltage vector take the position shown in Fig. 8, which positions are the same relative to the sector A as illustrated in Fig. 5. As a result, removal of the signal again arrests firing of the tube. This same means is arranged automatically to retard the grid bias and restore it to its normal, non-firing position represented in Fig. 4 as soon as the tube stops firing. Herein the flow of plate current, which is an indication of conduction or non-conduction of the tube, is utilized to introduce automatically the desired phase shift into the grid circuit. To that end, the inductance 70 shown in the basic circuit of Fig. 2 is replaced by the secondary winding 80 of a saturable reactor, generally designated 81. The primary 82 of the reactor 81 is by leads 83 and 84 connected to the common cathode return 37, with a variable resistor 85 connected in series in the common cathode return and shunting the reactor primary. The effective inductance of the winding 80 now depends on the amount of unidirectional current flowing through the reactor primary 82. As long as the circuit is in stand-by condition, that is, no signal being received, the tubes are non-conducting and no current flows through the primary of the saturable reactor 81. Under that condition, the inductance of the winding 80 has its highest value and with suitable adjustment of the resistor 71 the vector diagram of Fig. 4 is easily obtained. If now one tube is fired as previously described, a part of the plate current, determined by the value of the resistor 85, flows through the reactor primary winding 82 and effectively reduces the inductance of the winding 80. Accordingly, the grid bias voltage vector GBVV will be advanced in phase, which advance disappears when the flow of plate current stops, that is, when the tube ceases to conduct. By proper adjustment of the resistor 85, this advance of the grid bias can be made to correspond exactly to the advance of the plate voltage during firing of the tube to result in the vector relationship shown in Fig. 8. The circuit, as a result, now again has a simple on-off characteristic.

In order to avoid a direct connection of the bias phase shifter means 24 with the grid circuit, a grid bias transformer 86 is provided for effecting connection between the phase shifting means and the grid circuit. This transformerd has a primary winding 87, one end of which is connected to the bias phase shifter means 24 intermediate the resistor 71 and the winding 80, the same as was the lead 72 of the basic circuit. The other end of the winding 87 is by a lead 88 connected to a center tap on the secondary winding 61 of the heater transformer 30, as was the lead 73 of the basic circuit. The secondary winding 89 of the transformer 86 is connected on opposite sides of a condenser 90 interposed in a lead 91 connected at one end to the center tap of the secondary winding 65 of the input transformer and at the other end to the common cathode return 37 at the juncture of the lead 83 therewith.

Figure 12:
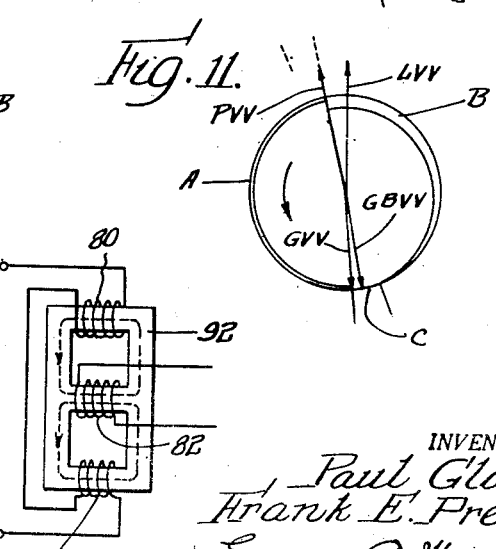
Fig. 12 is an enlarged view of a saturable reactor showing the actual construction thereof.

Of importance herein is the actual physical design of the reactor 81. As best seen in Fig. 12, the core 92 of the reactor takes the shape of a figure-eight, with the primary winding 82 wound on the intermediate leg of the core, and divided parts of the secondary winding 80 wound one on each of the outer legs of the core. The parts of the winding 80 are so arranged that their fluxes add in the outer legs but cancel in the center leg, so that no alternating current voltage is induced in the primary winding 82.

Also of importance is the sensitivity of the bias phase shifting means 24, for it is desirable to obtain as large a phase shift as possible for a small change in inductance produced by the flow of current in the primary 82. It has been found that for best sensitivity the phase angle of the grid bias voltage vector should be small. This is, however, in contradiction to the purpose of the bias phase shifter which is to supply a grid bias voltage close to 180° out of phase with the line voltage. To attain this sensitivity and at the same time retain the large phase angle of the grid bias vector relative to the line voltage, the condenser 90, connected as above described, is provided. The bias phase shifting means 24 is originally adjusted for a position of the vector GBVV which is well advanced into the sector B, that is, having a reduced phase angle with respect to the line voltage, and hence increased sensitivity. By connecting the phase shifter to the condenser 90, as above described, and with the condenser inserted in the common grid lead 91, the voltage as taken across the condenser is now shifted back into the vicinity of a 180° phase angle, that is, to the position of the grid bias voltage vector shown in Fig. 4.

Figure 9:
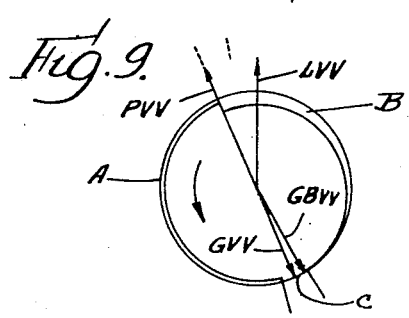
Fig. 9 is a view of the type of Fig. 4 showing the grid bias voltage advanced through a greater angle than the plate voltage.
Figure 10:
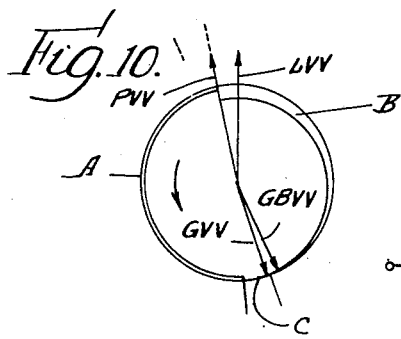
Fig. 10 is a view of the type of Fig. 4 showing the condition wherein the tube has stopped firing but the grid bias has not yet returned to its normal stand-by position of Figs. 4 and 5.
Figure 11:
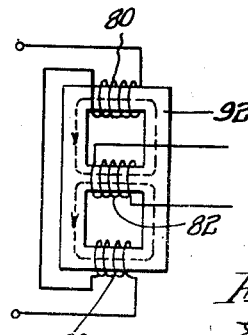
Fig. 11 is a view of the type of Fig. 4 with the tube again ready to re-commence firing.

It has already been pointed out that, through the provision of the reactor 81, receiving its primary current from the plate currents of the tubes and adjusted in a certain manner, the phase shift of the plate voltage can be counteracted automatically so as again to render the circuit an on-and-off circuit. Herein this circuit arrangement is employed to bring about a result of even greater importance, namely, a control of the speed of the motor 15 by the magnitude of the signal voltage. This is accomplished by increasing the value of the shunt resistor 85 so as to increase the proportion of plate current flowing through the primary winding 82 of the reactor 81, the proportion of current flowing through the winding 82 being sufficiently large to effect a phase shift in the grid bias voltage which more than offsets the advance in plate voltage upon commencement of firing of the tube. The effect of this excessive phase shift can again be best understood by reference to the vector diagrams, Figs. 4 to 11. Stand-by condition, that is, when no signal is being received, is that disclosed in Fig. 4, as previously described. With the application of a signal, a grid voltage vector GVV results which is positioned just within the sector A (Fig. 5), resulting in breakdown of the tube. Immediately upon such break-down, the plate voltage of the tube advances so that not only the grid voltage vector but also the grid bias voltage vector is within the sector A, as shown in Fig. 6. With firing of the tube, current flows in the primary 82 of the reactor 81, resulting in an advance of the grid and the grid bias voltage vectors, as above explained. This advance now, however, is not equal to the advance of the plate voltage, but is greater, with the result that the positions of the vectors shown in Fig. 8 is but an instantaneous position, with the final position that represented in Fig. 9, wherein the grid voltage vector also lies beyond the sector A so as to arrest firing of the tube even though the signal is still applied. With arrest of firing of the tube, the plate voltage, of course, returns to its non-firing position, leaving the grid and the grid bias voltage vectors substantially removed from the sector A, as shown in Fig. 10. With the tube no longer firing, the current through the reactor primary 82 will decay in accordance with the time constant of the circuit consisting of shunt resistor 85 and winding 82, so that the grid and grid bias voltage vectors swing back toward the sector A until they reach the position of Fig. 11, wherein the grid voltage vector enters the sector A, thereby again causing break-down of the tube.

With the circuit operating as just described, the motor 15 will be energized intermittently, i. e., with pulses, receiving energy during on-times and being deenergized during off-times. Average speed of the motor, therefore, will be proportional to the ratio of the on-time to the sum of the on-time and the off-time. The smallest possible on-time or pulse is obtained when the thyratron conducts during one positive half cycle only. This condition can be realized by adjusting the time constant of the resistor-reactor primary circuit 85, 82 so as to obtain a fast enough current rise in the reactor primary to stop conduction of the tube after only one cycle. Assuming the minimum on-time and a maximum off-time for any given signal to be desirable, a critical value of the resistor 85 is called for. If 85 is made smaller than the critical value, more than one cycle would be required to build up the primary current to a value sufficient to stop conduction of the tube. If the value of the resistor 85 is larger than the critical value, the time constant of this circuit would be smaller, with a resultant more rapid decline in the primary current after conduction had stopped, thereby reducing the off-time. Where the above conditions are not desired, the resistor 85 may take a value giving an on-time or pulse of two or more cycles and an off-time of desired length.

With the time constant of the resistor-reactor primary circuit 85, 82 adjusted to stop conduction of the tube after only one cycle, the current flow that will build up in the winding 82 will always be the same. This will be true regardless of the precise moment in the half cycle that the plate is positive at which the grid voltage vector may pass out of the sector A, because, in any event, the tube will continue to conduct for the remainder of that positive half cycle. Under this condition, the advance given to the grid bias voltage by the flow of current through the winding 82 is constant and given by the circuit elements. This advance is, by adjustment and selection of the element values, made large enough to cause the grid voltage vector under any condition, except signals of the largest magnitude contemplated, to fall within the dead zone of the tube and thus arrest conduction. This angle of advance, for example, may be that represented between the positions of the grid bias voltage vector, as shown in Figs. 5 and 9. While the angle of grid bias voltage advance is constant, the phase relationship of the grid voltage relative to the grid bias voltage, that is, the angle of the grid voltage vector relative to the grid bias voltage vector, will vary in accordance with the magnitude of the signal voltage. The larger the applied signal, the larger is the lag of the grid voltage with respect to the grid bias voltage. Thus the larger the applied signal voltage, the smaller is the actual advance of the grid voltage vector as a result of the advance of the grid bias voltage, and, therefore, the grid voltage vector may end up in any position from just clockwise of the grid bias voltage vector to a position within the sector A. In Fig. 9, a small signal voltage is assumed, and thus the grid voltage vector has a position well advanced beyond the sector A, and this is particularly true when, as a result of arrest of firing of the tube at the end of the positive half of one cycle, the plate voltage returns to its non-firing condition shown in Fig. 10. Under these conditions, a considerable number of cycles will elapse before the grid bias voltage and with it the grid voltage is retarded in phase until the grid voltage vector again enters the sector A, as shown in Fig. 11, thereby again initiating conduction of the tube for one cycle. With signals of successively larger voltage magnitudes, the position of the grid voltage vector approaches more and more closely to the sector A, and may even, as above stated, remain within the sector A. Thus, as the grid voltage vector has a smaller and smaller angle through which it must return, as the magnitude of the signal voltage increases, the cycles elapsing before the tube again fires are fewer in number, and, where the grid voltage vector remains in the sector A, the tube, of course, fires each cycle and the motor operates at full speed. It has been found that as the signal voltage approaches zero the motor is supplied with energy only during one of twelve cycles. Inasmuch as the motor receives progressively less energy, as the signal voltage approaches zero, the circuit is admirably adapted for positional control purposes, for the danger of the motor overrunning its mark is practically nil.

While the speed control has herein been described under circumstances wherein the firing of the tube results in a phase advance of the plate voltage relative to its non-firing voltage, and, while the circuit as described is capable of overcoming this added problem and, in fact, even turns the same into an advantage, it is believed readily appreciated and it is intended to be understood that the circuit disclosed serves equally well to obtain speed control in the case of motors, or frequency of energizing pulses in the case of other devices where this advance in the firing plate voltage is not present. This is believed apparent from the foregoing description and can readily be appreciated from the following analysis. The advance in phase imparted to the grid bias voltage may be considered as composed of two parts, namely, that made to compensate for the advance of the plate voltage of the tube upon firing and the additional advance given to carry the grid voltage vector beyond the sector A with the application of all but the largest signals. Under conditions where the advance in the plate voltage of the tube upon firing of the tube does not take place, the circuit can be adjusted to eliminate that portion of the grid bias voltage advance in phase which is made solely to compensate for the advance in the plate voltage of the tube. This would then leave the additional advance made to make the off-time of the tube inversely proportional to the magnitude of the signal voltage.

As previously stated, the application of a signal voltage added to the grid bias voltage results in a grid voltage for one of the tubes which is retarded, and thus, as illustrated in Fig. 5, is swung into the A sector of the tube to result in firing of the tube. This same signal advances the grid voltage of the other tube and thus swings the grid voltage vector (not here shown) further into the dead zone C to prevent firing of that tube. With a small signal nothing undesirable occurs, but it is believed appreciated that, should the signal remain 90° out of phase with the line voltage and grow to substantial magnitudes, the grid voltage vector of the non-firing tube would be advanced far enough to enter the sector B and thus result in firing of this supposedly non-firing tube at the end of the positive half cycles, with a consequent small impulse on the motor in opposition to the impulse of the firing tube. It is to reduce this tendency of the non-firing tube to fire with the larger signals within the range here contemplated that the particular tuned arrangement of condenser 62 and winding 52 of the input transformer 53 is provided.

The condenser 62 and the winding 52, as stated, are so adjusted as to have equal reactance at substantially the minimum signal value. At that time the core of the transformer 53 is being operated at the beginning or lower end of its permeability curve, with the result that up to a certain degree an increase in the signal voltage results in an increase in the inductance of the winding 52. The ultimate result, of course, is a progressive lag in the phase of the signal voltage as it increases in magnitude. Thus if, in Fig. 5, the signal voltage effective on the non-firing tube be pictured as a vector extending to the right from the tip of the grid bias voltage vector GBVV, substantially at right angles thereto, it will be seen that as the vector grows in length with an increase in the signal voltage it is also rotated clockwise to increase the angle between it and the grid bias voltage vector. The change in phase thus has a tendency to offset the advance in the grid voltage vector of the non-firing tube produced by the increase in signal voltage.

Despite the above described construction tending to prevent the grid voltage vector of the non-firing tube to be advanced so far as to enter the B sector, it is still conceivable, especially where the advance of the plate voltage upon firing of the tube must be compensated for, that the adjustment of the resistor 85 might be such that the phase advance of the grid bias would be so large as to cause the grid voltage vector of the non-firing tube to swing into the sector B even with a small signal. To eliminate this possibility, the resistor 95 is provided interposed between the lead 36 connecting the cathodes of the tubes and the juncture of the leads 83, 91 and resistor 85. While a tube is firing, the current flowing through the resistor 95 will cause a voltage drop across the resistor which will create a negative grid bias on the other tube, thereby preventing this other tube from firing momentarily near the end of the positive half cycle.

Means is provided herein for employing as the non-firing plate voltage of the tubes not merely the voltage resulting from that induced in the shading coils 17 and 18 of the motor, but the full line voltage. To that end, a pair of resistors 96 are connected in series between the windings 26 and 28. A lead 97 connected at one end to the line wire W1 through the lead 74 is connected at the other end to the common terminal of the resistors 96, while a lead 98 connected at one end to the line wire W2 through the lead 75 is connected to parallel leads 99 and 100 serving as the common cathode return dsignated 37 in the basic circuit of Fig. 2. The lead 99 has resistors 101 and 102 connected in series interposed therein, while the lead 100 has resistors 103 and 104 interposed in series therein. The resistors 101, 102, 103 and 104 are substantially larger than the resistors 96, resistors 101 and 103 being of the order of 30,000 ohms, and resistors 102 and 104 being of the order of 15,000 ohms, while resistors 96 are of the order of 500 ohms, so that the circuit acts as a voltage divider circuit. Connected from the lead 97 to the lead 99 intermediate the resistors 101 and 102 is a glow lamp 105, and, similarly, connected between the lead 97 and the lead 100 intermediate the resistors 103 and 104 is a glow lamp 106. The voltage at which lamps 105 and 106 glow is rather critical and is not reached when neither tube is firing. As tube 19 or 20 fires, however, the current flowing through the corresponding resistor 96 raises the voltage on the associated glow lamp above the critical value. Thus the lamp 105 will glow whenever the tube 19 is firing, and similarly, the lamp 106 will glow whenever the tube 20 is firing, thereby serving as indicator means both for the direction of motor rotation as well as speed of rotation.

The common cathode return in the complete circuit of Fig. 1 includes a switch, generally designated 107. The switch has a movable contact 108 connected by a lead 109 to the parallel leads 99 and 100 and, in the position shown in Fig. 1, engages a stationary contact 110 forming a terminus of lead 37 of Fig. 1 to complete the common cathode return. This position of the switch may be termed the automatic position, for in this position the circuit functions automatically to determine the direction and speed or rotation of the motor 15, depending upon the character and the magnitude of the signal received. The switch is also capable of being swung to either side of its neutral position, and when swung clockwise, as viewed in Fig. 1, makes contact with one terminal of a resistor 111 connected at its other end to the lead 34, and when swung counterclockwise makes contact with one terminal of a resistor 112 connected at its other end to the lead 35. It is readily apparent that the switch in either of the last two named positions serves to cause rotation of the motor at full speed in one direction or the other, depending upon which way the switch is swung, by shorting the circuit of the secondary windings of the reactor. The resistors 111 and 112 are provided to prevent overheating of the motor, which might otherwise result due to the presence of the full line voltage in addition to the induced voltage. The switch has a fourth position counterclockwise of its position of engagement with the resistor 112, which is an off-position in which the circuit is rendered completely inoperative.

It is believed apparent from the foregoing that we have perfected a highly advantageous control circuit having as its outstanding feature determination or control of the speed of operation of a controlled device in accordance with the magnitude of the voltage of a controlling signal. Not only is the speed of operation of the controlled device governed by the magnitude of the signal voltage, but the speed varies with the magnitude of the signal voltage decreasing as the signal voltage decreases. This renders the circuit particularly valuable for control purposes where, for example, some desired condition is to be maintained and an unbalance from that condition produces a controlling signal. Under such circumstances, the signal can be made in proportion to the unbalance or the departure from the condition to be maintained, and hence, as that unbalance is reduced and the condition returned more closely to that to be maintained, the signal voltage will be reduced and thus the speed of operation of the control device will be less and less as the desired condition is again restored. The possibility of overrunning is thus greatly reduced, if not completely eliminated. The circuit has the additional advantages that the control device, particularly where that is a motor, though being controlled by unidirectional current, has, nevertheless, a motor current of sine wave form. The same arrangement that results in the sine wave motor current also provides a current step-up between the tube and motor, so that an A. C. motor may be operated under rated conditions though it is controlled by unidirectional tubes materially smaller in size than the rating of the motor would normally require. Other advantages are the connection of but a single transformer to the line wires, high plate voltage, and other advantages previously brought out, all with comparative simplicity of the complete circuit.

We claim as our invention:

1. A circuit for controlling the operation of an electrical device comprising an electric-valve tube having an anode, a cathode and a grid, a grid circuit, means placing an alternating current bias on the grid preventing said tube from firing in the absence of a signal, means for imposing a signal on the grid, an anode circuit impressing an alternating current voltage on the anode, means connected in the anode circuit and electrically associated with the device to be controlled to cause an energizing impulse to be given to the device with each firing of said tube, and means governing the frequency of firing of said tube in accordance with the magnitude of the signal imposed on the grid.

2. A circuit for controlling the flow of current in an electrical device comprising an electric-valve tube having an anode, a cathode and a grid, an anode circuit imposing an alternating current voltage on the anode, means electrically associated with the anode circuit and electrically associated with the device to be controlled to govern the flow of current therein, a grid circuit, means for placing an alternating current bias on the grid preventing said tube from firing in the absence of a signal, means for imposing an alternating current signal on the grid causing the grid voltage to lag in phase the grid bias voltage various amounts depending upon the magnitude of the signal voltage, and means for automatically advancing or retarding in phase the grid bias voltage respectively as said tube fires or ceases to fire.

3. A circuit for controlling the flow of current in an electrical device comprising an electric-valve tube having an anode, a cathode and a grid, an anode circuit imposing an alternating current voltage on the anode, means electrically associated with the anode circuit and electrically associated with the device to be controlled to govern the flow of current therein, a grid circuit, means for placing an alternating current bias on the grid preventing said tube from firing in the absence of a signal, means for imposing an alternating current signal on the grid causing the grid voltage to lag in phase the grid bias voltage various amounts depending upon the magnitude of the signal voltage, and means for automatically advancing or retarding in phase the grid bias voltage respectively as said tube fires or ceases to fire with the advance in the grid bias voltage taking place during the positive half cycle of the anode voltage.

4. A circuit for controlling the flow of current in an electrical device comprising an electric-valve tube having an anode, a cathode and a grid, an anode circuit imposing an alternating current voltage on the anode, means electrically associated with the anode circuit and electrically associated with the device to be controlled to govern the flow of current therein, a grid circuit, means for placing an alternating current bias on the grid preventing said tube from firing in the absence of a signal, means for imposing an alternating current signal on the grid causing the grid voltage to lag in phase the grid bias voltage various amounts depending upon the magnitude of the signal voltage, and means for automatically advancing or retarding in phase the grid bias voltage respectively as said tube fires or ceases to fire, said grid bias phase changing means causing the advance in phase to take place during the positive half cycle of the anode voltage and the retardation in phase to take place at a slower rate.

5. A circuit for controlling the flow of current in an electrical device comprising an electric-valve tube having an anode, a cathode and a grid, an anode circuit imposing an alternating current voltage on the anode, means electrically associated with the anode circuit and electrically associated with the device to be controlled to govern the flow of current therein, a grid circuit, means for placing an alternating current bias on the grid preventing said tube from firing in the absence of a signal, means for imposing an alternating current signal on the grid causing the grid voltage to lag in phase the grid bias voltage various amounts depending upon the magnitude of the signal voltage, and means for automatically advancing or retarding in phase the grid bias voltage respectively as said tube fires or ceases to fire, said grid bias phase changing means causing the advance in phase to take place during the positive half cycle of the anode voltage and to be of an amount to arrest firing of said tube at the end of the positive half of the anode voltage cycle for all signal voltages up to a predetermined magnitude.

6. A circuit for controlling the flow of current in an alternating current operated electrical device comprising a tube of the thyratron type having an anode, a cathode and a grid, with a range of phase relationship between the grid voltage and the anode voltage in advance of the anode voltage, disposition of the grid voltage vector within which results in firing of the tube for substantially the entire half cycle that the anode is positive, and a dead zone in advance of said firing range, a grid circuit, means for placing an alternating current bias on the grid having a phase angle placing the grid bias voltage vector in the dead zone just in advance of the firing range of said tube, means for imposing an alternating current signal on the grid retarding the grid voltage relative to the grid bias voltage varying amounts depending upon the magnitude of the signal voltage, a reactor having a primary winding in circuit with the device to be controlled and a secondary winding in the anode circuit of said tube, the primary winding of said reactor having a normal relatively high impedance when no unidirectional current is flowing in the secondary winding and a sufficiently lowered impedance when unidirectional current is flowing thereby to govern application of an energizing impulse to the device associated with said reactor, and means operable upon firing of the tube automatically to advance the phase of the grid bias voltage a predetermined amount independent of the magnitude of the signal voltage to render the position of the grid voltage vector and firing of the tube dependent upon the magnitude of the signal voltage.

7. A circuit for controlling the flow of current in an alternating current operated electrical device comprising a tube of the thyratron type having an anode, a cathode and a grid, with a range of phase relationship between the grid voltage and the anode voltage in advance of the anode voltage, disposition of the grid voltage vector within which results in firing of the tube for substantially the entire half cycle that the anode is positive, and a dead zone in advance of said firing range, a grid circuit, means for placing an alternating current bias on the grid having a phase angle placing the grid bias voltage vector in the dead zone just in advance of the firing range of said tube, means for imposing an alternating current signal on the grid retarding the grid voltage relative to the grid bias voltage varying amounts depending upon the magnitude of the signal voltage, a reactor having a primary winding in circuit with the device to be controlled and a secondary winding in the anode circuit of said tube, the primary winding of said reactor having a normal relatively high impedance when no unidirectional current is flowing in the secondary winding and a sufficiently lowered impedance when unidirectional current is flowing thereby to govern application of an energizing impulse to the device associated with said reactor, and means operable upon firing of said tube to advance the phase of the grid bias voltage through a predetermined angle such that with a large applied signal voltage the grid voltage vector remains in the firing range of said tube, while with lesser signal voltages applied the grid voltage vector is advanced progressively farther into the dead zone of said tube, said last named means causing the advance in phase of the grid bias voltage to take place in less than one cycle of the anode voltage and retardation in phase to take place at a slower rate.

8. A circuit for controlling the flow of current in an alternating current operated electrical device comprising an electronic tube of the thyratron type having an anode, a cathode and a grid, a grid circuit, phase shifter means for placing an alternating current bias on the grid operable to prevent firing of the tube in the absence of a signal, means for imposing an alternating current signal on the grid having a phase relationship retarding the grid voltage in phase relative to the grid bias voltage varying amounts depending upon the magnitude of the signal voltage, a reactor having a primary winding in circuit with the device to be controlled and a secondary winding in the anode circuit of said tube, the primary winding of said reactor having a normal, relatively high impedance when no unidirectional current is flowing in the secondary winding, and a sufficiently lowered impedance when unidirectional current is flowing thereby to govern application of an energizing impulse to the device associated with said reactor, and means electrically associated with said phase shifter means and operable in response to firing of said tube to cause said phase shifter means to advance the grid bias voltage in phase and to restore the grid bias voltage to its normal phase relationship upon cessation of firing of said tube.

9. A circuit for controlling the flow of current in an alternating current operated electrical device comprising an electronic tube of the thyratron type having an anode, a cathode and a grid, a grid circuit, phase shifter means electrically associated with said grid circuit to place an alternating current bias on the grid having a phase relationship relative to the voltage impressed upon the anode of said tube to prevent firing of the tube in the absence of a signal including a variable inductance and a resistance, means for imposing an alternating current signal on the grid having a phase relationship retarding the grid voltage in phase relative to the grid bias voltage varying amounts depending upon the magnitude of the signal voltage, a reactor having a primary winding in circuit with the device to be controlled and a secondary winding in the anode circuit of said tube, the primary winding of said reactor having a normal, relatively high impedance when no unidirectional current is flowing in the secondary winding, and a sufficiently lowered impedance when unidirectional current is flowing thereby to govern application of an energizing impulse to the device associated with said reactor, and means operable upon firing of said tube to vary the inductance of said phase shifting means to advance the grid bias voltage in phase.

10. A circuit for controlling the flow of current in an alternating current operated electrical device comprising an electronic tube of the thyratron type having an anode, a cathode and a grid, a grid circuit, phase shifter means electrically associated with said grid circuit to place an alternating current bias on the grid having a phase relationship relative to the voltage impressed upon the anode of said tube to prevent firing of the tube in the absence of a signal including a saturable reactor having a primary winding and a secondary winding, and a resistance in circuit with said secondary winding, means for imposing an alternating current signal on the grid having a phase relationship retarding the grid voltage in phase relative to the grid bias voltage varying amounts depending upon the magnitude of the signal voltage, a reactor having a primary winding in circuit with the device to be controlled and a secondary winding in the anode circuit of said tube, the primary winding of said reactor having a normal, relatively high impedance when no unidirectional current is flowing in the secondary winding, and a sufficiently lowered impedance when unidirectional current is flowing thereby to govern application of an energizing impulse to the device associated with said reactor, and means including a resistance connected in the anode circuit and having the primary winding of said saturable reactor connected in parallel therewith for automatically altering the inductance of said phase shifter means to advance the phase of the grid bias voltage upon firing of said tube.

11. A circuit for controlling the flow of current in an alternating current operated electrical device comprising an electronic tube of the thyratron type having an anode, a cathode and a grid, a grid circuit, phase shifter means electrically associated with said grid circuit to place an alternating current bias on the grid having a phase relationship relative to the voltage impressed upon the anode of said tube to prevent firing of the tube in the absence of a signal including a saturable reactor having a primary winding and a secondary winding, and a resistance in circuit with said secondary winding, means for imposing an alternating current signal on the grid having a phase relationship retarding the grid voltage in phase relative to the grid bias voltage varying amounts depending upon the magnitude of the signal voltage, a reactor having a primary winding in circuit with the device to be controlled and a secondary winding in the anode circuit of said tube, the primary winding of said reactor having a normal, relatively high impedance when no unidirectional current is flowing in the secondary winding, and a sufficiently lowered impedance when unidirectional current is flowing thereby to govern application of an energizing impulse to the device associated with said reactor, and means including a resistance connected in the anode circuit and having the primary winding of said saturable reactor connected in parallel therewith for automatically altering the inductance of said phase shifter means to advance the phase of the grid bias voltage upon firing of said tube, said resistance-primary winding circuit having a time constant causing the grid bias voltage phase advance to take place during the positive half cycle of the anode voltage and the retardation to take place at a slower rate.

12. A circuit for controlling the flow of current in an alternating current operated electrical device comprising an electronic tube of the thyratron type having an anode, a cathode and a grid, a grid circuit, phase shifter means electrically associated with said grid circuit to place an alternating current bias on the grid having a phase relationship relative to the voltage impressed upon the anode of said tube to prevent firing of the tube in the absence of a signal including a saturable reactor having a primary winding and a secondary winding, and a resistance in circuit with said secondary winding, means for imposing an alternating current signal on the grid having a phase relationship retarding the grid voltage in phase relative to the grid bias voltage varying amounts depending upon the magnitude of the signal voltage, a reactor having a primary winding in circuit with the device to be controlled and a secondary winding in the anode circuit of said tube, the primary winding of said reactor having a normal, relatively high impedance when no unidirectional current is flowing in the secondary winding, and a sufficiently lowered impedance when unidirectional current is flowing thereby to govern application of an energizing impulse to the device associated with said reactor, and means including a variable resistance connected in the anode circuit and having the primary winding of said saturable reactor connected in parallel therewith for automatically altering the inductance of said phase shifter means to advance the phase of the grid bias voltage upon firing of said tube, said resistance-primary winding circuit having a time constant causing the grid bias voltage phase advance to take place during the positive half cycle of the anode voltage and to be of an amount to arrest firing of said tube at the end of the positive half of the anode voltage cycle for all signal voltages up to a predetermined magnitude, and the retardation to take place at a slower rate.

13. A circuit for controlling the flow of current in an alternating current operated electrical device comprising an alternating current source; a tube of the thyratron type having an anode, a cathode and a grid; a grid circuit; means for placing an alternating current bias on the grid comprising a first transformer having a primary winding connected to said alternating current source and a secondary winding, a saturable reactor having a primary winding and a secondary winding, a resistance connected in series circuit with said secondary winding of said reactor and the secondary winding of said transformer, a grid bias transformer having a primary winding connected to the midpoint of the secondary winding of said first transformer and to a common terminal of said resistance and said reactor secondary winding, and a secondary winding connected in said grid circuit and a condenser connected in parallel with said last named secondary winding; means for imposing an alternating current signal on the grid having a phase relationship retarding the grid voltage in phase relative to the grid bias voltage varying amounts depending upon the magnitude of the signal voltage; a reactor having a primary winding in circuit with the device to be controlled and a secondary winding in the anode circuit of said tube, the primary winding of said reactor having a normal, relatively high impedance when no unidirectional current is flowing in the secondary winding, and a sufficiently lowered impedance when unidirectional current is flowing thereby to govern application of an energizing impulse to the device associated with said reactor; and means including a resistance connected in the anode circuit and having the primary winding of said saturable reactor connected in parallel therewith operable to vary the inductance of said phase shifter means to advance the phase of the grid bias voltage upon firing of the tube.

14. A circuit for controlling the operation of an alternating current, shaded pole motor comprising an electric-valve tube of the thyraton type having an anode, a cathode and a grid, a grid circuit, means for placing an alternating current bias on the grid preventing the tube from firing in the absence of a signal, means for imposing an alternating current signal on the grid, an anode circuit, means connected in the anode circuit and electrically associated with the shading coil winding of the motor to govern the operation of the motor, said last named means serving to advance in phase the anode voltage of said tube when firing relative to its non-firing voltage, and means for automatically advancing or retarding in phase the grid bias voltage respectively as the anode voltage is advanced or retarded.

15. A circuit for controlling the operation of an alternating current, shaded pole motor comprising an electric-valve tube of the thyratron type having an anode, a cathode and a grid, a grid circuit, means for placing an alternating current bias on the grid preventing the tube from firing in the absence of a signal, means for imposing an alternating current signal on the grid, an anode circuit, means connected in the anode circuit and electrically associated with the shading coil winding of the motor to govern the operation of the motor, said last named means serving to advance in phase the anode voltage of said tube when firing relative to its non-firing voltage, and means for automatically advancing or retarding in phase the grid bias voltage respectively as the anode voltage is advanced or retarded, said grid bias phase shifting means being adjustable to shift the phase of the grid bias through a greater angle than said anode voltage is shifted.

16. A circuit for controlling the operation of an alternating current, shaded pole motor comprising an electric-valve tube of the thyratron type having an anode, a cathode and a grid, a grid circuit, means for placing an alternating current bias on the grid preventing the tube from firing in the absence of a signal, means for imposing an alternating current signal on the grid having a phase relationship retarding the phase of the grid voltage relative to the grid bias voltage varying amounts depending upon the magnitude of the signal voltage, an anode circuit, means connected in the anode circuit and electrically associated with the shading coil winding of the motor to govern the operation of the motor, said last named means serving to advance in phase the anode voltage of said tube when firing relative to its non-firing voltage, and means for automatically advancing or retarding in phase the grid bias voltage respectively as the anode voltage is advanced or retarded, said grid bias phase shifting means being adjustable to shift the phase of the grid bias through an angle sufficiently greater than that through which the anode voltage is shifted to arrest firing of said tube at the end of the positive half of the anode voltage cycle for all signal voltages up to a predetermined magnitude and restoring the grid bias voltage to its original phase at a slower rate than it is advanced.

17. In an electrical control circuit, a source of alternating current, a motor to be controlled having a main winding adapted to be connected to the alternating current source and an auxiliary winding having voltage induced therein from said main winding, an electric-valve tube of the thyratron type having an anode, a cathode and a grid, a reactor having a primary winding in circuit with said auxiliary winding and a secondary winding in the anode circuit of said tube; the primary winding of said reactor having a normal, relatively high impedance when no unidirectional current is flowing in the secondary winding, and a sufficiently lowered impedance when unidirectional current is flowing thereby to govern application of an energizing impulse to said auxiliary winding, a grid circuit, phase shifter means for placing an alternating current bias on the grid preventing the tube from firing in the absence of a signal, means for imposing an alternating current signal on the grid having a phase relationship retarding the grid voltage in phase relative to the grid bias voltage varying amounts depending upon the magnitude of the signal voltage, and means electrically associated with said phase shifter means and operable in response to firing of said tube to cause said phase shifter means to advance the grid bias voltage in phase through an angle sufficient to cause arrest of firing of said tube at the end of a single positive half of the anode voltage cycle with any signal voltage up to a predetermined magnitude and retarding the grid bias voltage to its original phase at a slower rate than it is advanced.

18. In an electrical control circuit, a source of alternating current, a motor to be controlled having a main winding adapted to be connected to the alternating current source and an auxiliary winding having voltage induced therein from said main winding, an electric-valve tube of the thyratron type having an anode, a cathode and a grid, a reactor having a primary winding in circuit with said auxiliary winding and a secondary winding, the primary winding of said reactor having a normal, relatively high impedance when no unidirectional current is flowing in the secondary winding, and a sufficiently lowered impedance when unidirectional current is flowing thereby to govern the flow of current in said auxiliary winding, an anode circuit including in series said secondary winding and said source of alternating current, a grid circuit, phase shifter means for placing an alternating current bias on the grid operable to prevent firing of the tube in the absence of a signal, means for imposing an alternating current signal on the grid having a phase relationship retarding the grid voltage in phase relative to the grid bias voltage varying amounts depending upon the magnitude of the signal voltage, and means electrically associated with said phase shifter means and operable in response to firing of said tube to cause said phase shifter means to advance the grid bias voltage in phase through an angle sufficient to cause arrest of firing of said tube at the end of a single positive half of the anode voltage cycle with any signal voltage up to a predetermined magnitude and retarding the grid bias voltage to its original phase at a slower rate than it is advanced.

19. A circuit for controlling the speed and direction of rotation of a reversible electric motor having a pair of auxiliary windings, the flow of current in one or the other determining the direction of rotation, comprising a first and a second tube of the thyratron type each having an anode, a cathode and a grid, a grid circuit for each of said tubes having a common portion, common means placing an alternating current bias on the grid of each of said tubes preventing the same from firing in the absence of a signal, an anode circuit for each tube impressing an alternating current voltage on the anode and having a common cathode return, means connected in the anode circuit of each tube and electrically associated with one of said auxiliary motor windings to govern the flow of current therein, means for providing signals of varying voltage magnitude and of opposed character with the signals of one character initiating firing of one of said tubes and signals of opposed character initiating firing of the other of said tubes to determine the direction of rotation of the motor, and means determining the extent of current flow in the auxiliary windings in accordance with the magnitude of the signal voltage to govern the speed of rotation of the motor.

20. A circuit for controlling the direction and speed of rotation of a reversible electric motor having a pair of auxiliary windings, the flow of current in which determines the direction of rotation of the motor, comprising a pair of tubes of the thyratron type each having an anode, a cathode and a grid, an anode circuit for each tube imposing an alternating current voltage on the anode and having a common cathode return, means electrically associated with the anode circuit of each tube and electrically associated with one of said auxiliary windings to govern the flow of current therein, a grid circuit for each of said tubes having a common portion, common means for placing an alternating current bias on the grid of each of said tubes preventing the same from firing in the absence of a signal, means for providing an alternating current signal of varying voltage magnitude and of opposed character with one character of the signal initiating firing of one of said tubes and the signal of opposed character initiating firing of the other of said tubes, and means for determining the relative on- and off-times of a tube in accordance with the magnitude of the signal voltage to govern the speed of rotation of the motor.

21. A circuit for controlling the direction and speed of rotation of a reversible electric motor having a pair of auxiliary windings, the flow of current in which determines the direction of rotation of the motor, comprising a pair of tubes of the thyratron type each having an anode, a cathode and a grid, an anode circuit for each of said tubes imposing an alternating current voltage on the anode and having a common cathode return, a reactor for each of said tubes having a primary winding in circuit with one of said auxiliary windings and a secondary winding in the anode circuit of the tube, the primary winding of each reactor having a normal, relatively high impedance when no unidirectional current is flowing in the secondary winding, and a sufficiently lowered impedance when unidirectional current is flowing thereby to govern the flow of current in the auxiliary winding associated therewith, a grid circuit for each of said tubes having a common portion, phase shifter means having electrical connection with the common portion of said grid circuits for placing an alternating current bias on the grids operable to prevent firing of the tubes in the absence of a signal, means for providing an alternating current signal of varying voltage magnitude and of opposed character, said signal depending upon the character causing the grid voltage of one of said tubes to lag in phase the grid bias voltage various amounts depending upon the magnitude of the signal voltage, and means for automatically advancing or retarding in phase the grid bias voltage respectively as one of said tubes fires or both cease to fire, said grid bias phase changing means causing the advance in phase to take place during the positive half cycle of the anode voltage and to be of an amount to arrest firing of the firing tube at the end of the positive half of the anode voltage cycle for all signal voltages up to a predetermined magnitude and the retardation in phase to take place at a slower rate.

22. A circuit for controlling the direction and speed of rotation of a reversible electric motor having a pair of auxiliary windings, the flow of current in which determines the direction of rotation of the motor, comprising a pair of tubes of the thyratron type each having an anode, a cathode and a grid, an anode circuit for each of said tubes imposing an alternating current voltage on the anode and having a common cathode return, a reactor for each of said tubes having a primary winding in circuit with one of said auxiliary windings and a secondary winding in the anode circuit of the tube, the primary winding of each reactor having a normal, relatively high impedance when no unidirectional current is flowing in the secondary winding, and a sufficiently lowered impedance when unidirectional current is flowing thereby to govern the flow of current in the auxiliary winding associated therewith, a grid circuit for each of said tubes having a common portion, phase shifter means having electrical connection with the common portion of said grid circuits for placing an alternating current bias on the grids operable to prevent firing of the tubes in the absence of a signal, means for providing an alternating current signal of varying voltage magnitude and of opposed character, said signal depending upon the character causing the grid voltage of one of said tubes to lag in phase the grid bias voltage various amounts depending upon the magnitude of the signal voltage, and means including a resistor connected in the common cathode return and electrically associated with said phase shifter means operable automatically to advance or retard in phase the grid bias voltage respectively as one of said tubes fires or both cease to fire, said grid bias phase changing means causing the advance in phase to take place during the positive half cycle of the anode voltage and to be of an amount to arrest firing of the firing tube at the end of the positive half of the anode voltage cycle for all signal voltages up to a predetermined magnitude and the retardation in phase to take place at a slower rate.

23. A circuit for controlling the direction and speed of rotation of a reversible electric motor having a pair of auxiliary windings, the flow of current in which determines the direction of rotation of the motor, comprising a pair of tubes of the thyratron type each having an anode, a cathode and a grid, an anode circuit for each of said tubes imposing an alternating current voltage on the anode and having a common cathode return, a reactor for each of said tubes having a primary winding in circuit with one of said auxiliary windings and a secondary winding in the anode circuit of the tube, the primary winding of each reactor having a normal, relatively high impedance when no unidirectional current is flowing in the secondary winding, and a sufficiently lowered impedance when unidirectional current is flowing thereby to govern the flow of current in the auxiliary winding associated therewith, a grid circuit for each of said tubes having a common portion, phase shifter means having electrical connection with the common portion of said grid circuits for placing an alternating current bias on the grids operable to prevent firing of the tubes in the absence of a signal, means for providing an alternating current signal of varying voltage magnitude and of opposed character, said signal, depending upon the character, causing the grid voltage of one of said tubes to lag in phase the grid bias voltage various amounts depending upon the magnitude of the signal voltage, means including a resistor connected in the common cathode return and electrically associated with said phase shifter means operable automatically to advance or retard in phase the grid bias voltage respectively as one of said tubes fires or both cease to fire, said grid bias phase changing means causing the advance in phase to take place during the positive half cycle of the anode voltage and to be of an amount to arrest firing of the firing tube at the end of the positive half of the anode voltage cycle for all signal voltages up to a predetermined magnitude and the retardation in phase to take place at a slower rate, and a resistor connected intermediate the cathodes of said tubes and the juncture of the common cathode return and the common portion of said grid circuits.

24. A circuit for controlling the direction and speed of rotation of a reversible electric motor having a pair of auxiliary windings, the flow of current in which determines the direction of rotation of the motor, comprising a pair of tubes of the thyratron type each having an anode, a cathode and a grid, an anode circuit for each of said tubes imposing an alternating current voltage on the anode and having a common cathode return, a reactor for each of said tubes having a primary winding in circuit with one of said auxiliary windings and a secondary winding in the anode circuit of the tube, the primary winding of each reactor having a normal, relatively high impedance when no unidirectional current is flowing in the secondary winding, and a sufficiently lowered impedance when unidirectional current is flowing thereby to govern the flow of current in the auxiliary winding associated therewith, a fixed resistance and a variable resistor connected in series in the common cathode return of said anode circuits, a signal input transformer having a primary winding and a secondary winding, the terminals of the secondary winding being connected one to the grid of each of said tubes, an intermediate tap on said input transformer secondary winding being connected to the common cathode return intermediate the fixed resistance and the variable resistor, a condenser in said last named connection, phase shifter means inductively coupled in the grid circuits of said tube in parallel with said condenser and including a saturable reactor having a primary winding and a secondary winding, said phase shifter means being operable normally to place an alternating current bias on the grids of said tubes preventing firing of the tubes in the absence of a signal, means electrically associated with the primary winding of said input transformer operable to generate signals of opposed character and of variable voltage magnitude, the signals depending upon the character having a phase relationship with one of the tubes retarding the grid voltage in phase relative to the grid bias voltage varying amounts depending upon the magnitude of the signal voltage and advancing the grid voltage of the other tube, and means connecting the primary winding of said saturable reactor in parallel with said variable resistor to advance the phase of the grid bias voltage during the firing of either of said tubes, said variable resistor and the winding in circuit therewith being adjusted to have a time constant effecting the advance in grid bias phase shift in one-half cycle of anode voltage and to effect restoration of the grid bias voltage to its normal phase relationship at a slower rate, the angle of advance being great enough to arrest firing of the tubes for all signal voltages up to a predetermined magnitude.

25. A circuit for controlling the flow of current in an electrical device comprising an electric-valve tube having an anode, a cathode and a grid, an anode circuit imposing an alternating current voltage on the anode, means electrically associated with the anode circuit and electrically associated with the device to be controlled to govern the flow of current therein, a grid circuit, means for placing an alternating current bias on the grid preventing said tube from firing in the absence of a signal, means for imposing an alternating current signal on the grid causing the grid voltage to lag in phase the grid bias voltage various amounts depending upon the magnitude of the signal voltage, and means for automatically advancing or retarding in phase the grid bias voltage respectively as said tube fires or ceases to fire, said grid bias phase changing means causing the advance in phase to take place during a given number of cycles of the anode voltage and the retardation in phase to take place at a slower rate.

26. A circuit for controlling the operation of a pair of electrical devices comprising a first and a second tube of the thyratron type each having an anode, a cathode and a grid, a signal input transformer of the iron core type having a primary winding and a secondary winding, a grid circuit for each of said tubes having a common portion and including the secondary winding of said input transformer, common means placing an alternating current bias on the grid of each of said tubes preventing the same from firing in the absence of a signal, an anode circuit for each tube impressing an alternating current voltage on the anode and having a common cathode return, means connected in the anode circuit of each tube and electrically associated with one of the devices to be controlled to govern the same, means for supplying signals of varying voltage magnitude and of opposed character, with the signal of one character initiating firing of said first tube and the signal of opposed character initiating firing of said second tube, means electrically connecting said signal supplying means and said input transformer progressively varying the phase of the signal impressed on said transformer, as the signal increases, in a manner aiding in the prevention of momentary break-down of the non-firing tube at the end of the positive half cycle of anode voltage, and means causing energization of the electrical device associated with the firing tube in accordance with the magnitude of the signal voltage imposed.

27. A circuit for controlling the operation of a pair of electrical devices comprising a first and a second tube of the thyratron type each having an anode, a cathode and a grid, a signal input transformer of the iron core type having a primary winding and a secondary winding, a grid circuit for each of said tubes having a common portion and including the secondary winding of said input transformer, common means placing an alternating current bias on the grid of each of said tubes preventing the same from firing in the absence of a signal, an anode circuit for each tube impressing an alternating current voltage on the anode and having a common cathode return, means connected in the anode circuit of each tube and electrically associated with one of the devices to be controlled to govern the same, means for supplying signals of varying voltage magnitude and of opposed character, with the signal of one character initiating firing of said first tube and the signal of opposed character initiating firing of said second tube, means connecting said signal supplying means with said input transformer including a condenser connected in series with the primary winding of said input transformer, said condenser having a capacitance such that its reactance at the signal frequency and at a minimum signal value is equal to the reactance of the primary winding of said input transformer, and means causing energization of the electrical device associated with the firing tube in accordance with the magnitude of the signal voltage imposed.

PAUL GLASS.
FRANK E. PREM.

REFERENCES CITED

The following references are of record in the file of this patent:

UNITED STATES PATENTS

| Number | Name | Date |
| --- | --- | --- |
| 1,942,587 | Whitman | Jan. 9, 1934 |
| 2,114,614 | Schlesinger | Apr. 19, 1938 |
| 2,150,265 | Conover | Mar. 14, 1939 |
| 2,228,078 | Gulliksen | Jan. 7, 1941 |
| 2,333,393 | Ryder | Nov. 2, 1943 |
| 2,342,257 | Edgerton | Feb. 22, 1944 |
| 2,343,116 | Ryder | Feb. 29, 1944 |